United States Patent [19]

Ritsko et al.

[11] 4,348,231

[45] Sep. 7, 1982

[54] METHOD OF RECOVERING METAL CARBIDES

[75] Inventors: Joseph E. Ritsko; Martin B. MacInnis; Thomas L. Henson, all of Towanda, Pa.

[73] Assignee: GTE Products Corporation, Stamford, Conn.

[21] Appl. No.: 141,017

[22] Filed: Apr. 17, 1980

[51] Int. Cl.$^3$ .............................................. C22C 29/00
[52] U.S. Cl. .................................... 75/203; 75/204; 75/200; 75/211; 423/53; 423/55; 423/440; 209/208
[58] Field of Search ..................... 423/53, 55, 440; 75/200, 203, 204, 211; 209/208

[56] References Cited

U.S. PATENT DOCUMENTS

| | | | |
|---|---|---|---|
| 2,848,313 | 8/1958 | Takahashi et al. | 423/53 |
| 3,438,730 | 4/1969 | Shwayder | 423/53 |
| 3,483,969 | 12/1969 | Rosensweig | 209/208 |
| 3,635,674 | 1/1972 | Shwayder | 423/53 |
| 3,947,555 | 3/1976 | MacInnis et al. | 423/440 |

*Primary Examiner*—Brooks H. Hunt
*Attorney, Agent, or Firm*—Robert E. Walter

[57] ABSTRACT

Selected portions of metal carbide are recovered from scrap material containing pieces of cemented metal carbide having various compositions of metal carbide distributed in a matrix material. The scrap material is treated with a suitable liquid for a sufficient period of time to dissolve the matrix material and form a piece of matrix depleted metal carbide which is introduced as a feed into a ferrofluid material. A magnetic field is passed through the ferrofluid for positioning pieces of metal carbide of the type having a heavier density spaced from pieces of metal carbide of a lighter density. The separated portions of matrix depleted metal carbide are collected to produce metal carbide powder which may be further reprocessed to produce a desired cemented metal carbide.

8 Claims, No Drawings

METHOD OF RECOVERING METAL CARBIDES

This invention relates to a process for recovering concentrated portions of particulate metal carbide from scrap material containing cemented metal carbides.

Cemented metal carbides are typically used in cutting tool bits, dies, wear plates and generally comprise particles of metal carbides bonded together in a matrix of cementing agent. The above mentioned carbides are generally available in the form of scraps which may contain additional materials in the form of the machine turnings, metal clippings, and thus may contain a variety of both ferrous and nonferrous materials.

In one type of prior art process for separating or reclaiming the particular constituents of scrap material, the hard tungsten carbides are oxidized. One such method is disclosed in U.S. Pat. No. 2,704,240. The oxidized carbides may be then reprocessed to obtain the final purified product. According to U.S. Pat. No. 3,887,680 to MacInnis, Vanderpool and Boyer the oxidized tungsten carbide is digested in an aqueous solution of alkali metal hydroxide under controlled conditions to recover tungsten values. According to these type of processes, the constituents of scrap materials are returned to their soluble elemental values in an aqueous solution and the soluble metal values are separated by various methods to give relatively pure products. Thus, these processes can be used to form metal carbides indirectly.

According to other processes known in the prior art, cemented metal carbides are immersed in solutions to leach out the matrix or binder material so as to leave a residue of the metal carbide. The resulting metal carbide may be ground to a powder of the original particle size and can be directly reused in the preparation of cemented carbides. These processes are obviously advantageous where the desired final product is a metal carbide. A useable metal carbide directly results from a simple one or two step process and thus saves energy.

Typical processes of this type are disclosed in U.S. Pat. No. 3,438,730 to Shwayder where metal carbide cemented by cobalt is immersed in a weak phosphoric acid to cause the cobalt to dissolve and free the metal carbide particles.

U.S. Pat. No. 3,635,674 to Shwayder involves using ammonia or an amine in a sealed container containing elemental oxygen under pressure to cause the binder to react with the amine and free the refractory carbide in its original particulate form.

U.S. Pat. No. 2,848,313 to Kakahashi et al. discloses a method wherein the hard scrap is immersed in a fluid material which forms a deliquescent product with the binder material. Hydration of the deliquescent product causes internal stresses in the cemented metal carbide to cause disintegration.

According to these latter mentioned processes, the product after treatment is suitable for reuse in preparing new cemented carbides. However, a serious disadvantage of these processes is that the final resulting metal carbide product has essentially the same metal carbide constituency as the constituency of carbides in the starting scrap material. Thus, the scrap material which may contain various percentages of the various carbides, such as tungsten carbide, tantalum carbide, molybdenum carbide, titanium carbide or others depending on the origin of the scrap determines the constituency of the final product. There are many instances in which the resulting mixture of metal carbides cannot be used when it is desirable to produce a highly uniform and consistent product. Thus, to obtain high quality product it may be necessary to use the former methods for reclaiming the metal values for scrap with attendant disadvantages of higher energy use.

Heretofore, prior art processes for directly producing particulate metal carbide from scrap material containing cemented carbides have not been suitable for recovering concentrated portions of a particularly desired metal carbide.

SUMMARY OF THE INVENTION

In accordance with the present invention, there is provided a process for recovering selected portions of metal carbide from scrap material containing pieces of cemented metal carbide having various compositions of metal carbide distributed in a matrix material, said process comprising treating the scrap material with a suitable liquid for a sufficient period of time to dissolve said matrix material into said liquid, separating the liquid containing dissolved matrix material from the pieces of matrix depleted metal carbide, feeding the pieces of matrix depleted carbide into a ferrofluid material, passing a magnetic field through said ferrofluid for positioning pieces of matrix depleted metal carbide of a type having a heavier density spaced from pieces of matrix depleted metal carbide having a lighter density, collecting portions of pieces of matrix depleted metal carbide having a heavier density separate from a portion of pieces of matrix depleted metal carbide particles having a lighter density.

The present invention obviates many of the deficiencies associated with prior art methods of reclaiming particulate metal carbide particles from scrap material. By using the process of the present invention, a particular metal carbide powder may be obtained having a higher concentration of the desired type of metal carbide material directly from the scrap material.

Also in accordance with the present invention, at least one of the separated portions having a heavier or lighter density are further processed to form a cemented metal carbide by comminuting at least one of said portions of metal carbide to form a metal carbide powder, mixing said metal carbide powder with a binder metal to form a resulting powder and compressing and sintering said resulting powder to form a hard refractory cemented metal carbide.

DETAILED DESCRIPTION OF A PREFERRED EMBODIMENT

The scrap material being processed may contain in addition to metal carbides, various types of other metal values such as chromium, nickel, iron. Typical cemented metal carbides comprise one or more transitional carbides of a metal of Groups IVB, VB and VIB of the Periodic Table cemented or bonded by one or more matrix metals selected from the group consisting of iron, nickel and cobalt. Typical cemented carbides may contain tungsten carbide in a cobalt matrix, titanium carbide in a cobalt matrix or titanium carbide in a nickel matrix. Most scrap carbides comprise a mixture of the metal carbides.

According to the principles of the present invention, the scrap material is treated with a suitable liquid for a sufficient period of time to dissolve in the liquid the matrix material including magnetic material present in the scrap. The preferred liquid is an aqueous azeotropic hydrochloric acid which is about 20 percent hydrochloric acid and has a boiling point of about 110° C. Both higher and lower concentrations of acid then the azeotropic can be With high concentrations, hydrochloride is given off until the azeotrope is reached. In most instances it is convenient to use the azeotrope as the starting material. A sufficient amount of aqueous hydrochloric acid solution is used so as to totally immerse the scrap material. Preferably excess of hydrochloric acid is used. Most preferably about 200 percent greater than the amount needed to react with the magnetic material and the scrap is utilized.

In general, the size of the cemented refractory metal carbide pieces utilized is not critical when treating with hydrochloric acid. The length of time to remove the matrix material is related to the size of the cemented carbide. The larger the size, the longer the digestion is required. With particle sizes less than 0.25 inches in any dimension, the cobalt content can be reduced to below about 0.5 percent within about eight hours. In the case where the matrix binder material is cobalt, it has been found that only 2 moles of hydrochloric acid are consumed per mole of cobalt. As hereinbefore stated, it is preferable to use an excess amount of hydrochloric acid and a sufficient amount so as to totally immerse the scrap material in the aqueous hydrochloric acid solution. It is preferable that the digestion process by carried out for a sufficient period of time to reduce the matrix content of the carbide to less than about 0.3 percent, more preferably to less than 0.2 percent.

It has been found that with the use of the azeotropic hydrochloric acid solution, the magnetic material present in the scrap and the matrix material are dissolved into the solution leaving a residue of nonmagnetic metal carbide material comprising a matrix depleted pieces of metal carbide. It has been found that the aqueous solution containing dissolved magnetic metal values such as cobalt, iron and nickel may be processed to recover the valuable materials therefrom.

The resulting matrix depleted metal carbide product has a constituency based on the constituency of the metal carbide in the starting scrap. Typical scrap generally contains a large percentage by weight tungsten carbide particles cemented together with cobalt. However, depending on the type of scrap from which recovery is made, the scrap may contain quantities of other metal carbides such as tantalum carbide, titanium carbide and others. Cobalt is the most typical matrix or binder cement utilized for carbides. However, alloys of cobalt, nickel or iron may be used as binder material in certain circumstances. The solid metal carbide product resulting after the separation of the liquid containing dissolved magnetic material varies in size and amount depending on the size and amount of the starting cemented metal carbide present in the scrap. If the starting carbide products have a relatively large dimension, a metal carbide skeleton will result. The particle size of the metal carbide after digestion is larger than the particle size suitable for reuse in preparation of new cemented carbide.

In accordance with another aspect of the present invention, the metal carbide depleted of binder or matrix material and magnetic material is fed into a ferrofluid material. A magnetic field is passed through the fluid containing the particulate metal carbide so as to position particulate metal carbide particles of the type having the heavier densities spaced from particulate metal carbide particles of the type having a lighter density.

U.S. Pat. No. 3,483,969 to Rosensweig describes an apparatus of the type which may be used for this type of separation. According to the processes described in therein, materials of different density are separated using the principle of levitation in a ferrofluid. A ferrofluid is a material comprising a permanent suspension of ferromagnetic materials in a liquid carrier. The ferromagnetic material does not separate from the liquid carrier in the presence of a magnetic, gravitational, or acceleration field. The composite of carrier fluid and particles appears to have the property of magnetic polarizability that is uniform.

As set forth in the above-mentioned patent, the magnetic field must be strong enough to result in a noticeable magnetization of the fluid and the field must decrease in the vertical direction so as to create a vertical gradient. A further limitation in the process is that the materials to be separated must be nonmagnetic. The magnetic levitation effect will be smaller with solid objects that are magnetically responsive than with magnetically non-responsive materials. Magnetically responsive solids will behave as non-magnetic objects of higher density.

Each of the various types of metal carbides may be selectively concentrated by collecting respective portions of the cemented carbide particles which are separated by the ferrofluid levitation. Multiple concentration steps may be performed by reintroducing one of the portions of metal carbide into the ferrofluid. After ferrofluid separation, metal carbide pieces are comminuted to form a powder having a particle size suitable for reuse in the preparation of new cemented carbide. Thus, the separated metal carbide particles which may be larger than 0.25 inch are crushed to particle size less than about 20 microns. Preferably the reduced particle size is from about 1.5 to about 3 microns.

The metal carbide particles are mixed with particles of binder material and processed to form a refractory body consisting essentially of metal carbide particles dispersed throughout a matrix of the binder metal. Typical binder metals are cobalt, nickel, iron or mixtures thereof with cobalt being the most commonly used. The blended mixture is compressed and sintered to form a hard refractory which is particularly suited for the working surfaces of tools or other wear resistant articles. Pressing is generally performed in molds at pressures ranging from 5 to 30 tons per square inch depending on size and shape of compact. Sintering is performed at temperatures from about 1400° to 1500° centigrade on times of about 30 to 40 minutes.

EXAMPLE I

The scrap contains straight grade cemented tungsten carbide which is tungsten carbide cemented with cobalt absent portions of other carbides. Another scrap consistuency is an alloy metal carbide containing tungsten carbide, titanium carbide, tantalum carbide and cobalt in the form of irregular shaped pieces. The larger pieces of carbide have a dimension of as large as three quarters of an inch. The scrap material is emersed in about 2 parts of azeotropic (20.24% HCl) hydrochloric acid per part of scrap material. The hydrochloric acid solution is refluxed for about 7 days. The resulting metal carbide pieces are separated from the acid solution and washed. From a random sampling of the initial carbide and the final metal carbide pieces, it appears that the cobalt content is reduced from about 6.85 percent to about 0.21 percent. The leached metal carbide powder was fed into an AVCO Separation System. In the AVCO system, incoming mixed metals are separated in a static pool of ferrofluid suspended between poles of an electromagnet. An input conveyor carries the metals into the center of the ferrofluid pool. On entering the pool and leaving the conveyor, each separate piece must either float to the top of the pool or sink to the bottom depending on its density. An output conveyor breaks the floating pieces from the top of the fluid pool and delivers them to a chute. A second output conveyer carries the sink product from the bottom of the pool and delivers them to a second chute. The magnetic field gradient is adjusted by a dial so that an effective separation can be made. After processing through the above equipment, the sink portion was analyzed as containing 97.7 percent tungsten carbide, 1.26 percent tantalum carbide, 0.22 percent titanium carbide and less than 0.2 percent cobalt. The float portion analyzed as containing 86.5 percent tungsten carbide, 7.2 percent tantalum carbide, 5.84 percent titanium carbide and less than 0.2 percent cobalt. The ferrofluid density utilized in making the test was from about 12.75 through 13.75 gram/cubic centimeter. The sink and float portions were separately ground in a vibratory grinder to a particle size of about 2.2 micrometers (FSSS). Each portion was blended with a cobalt powder. The resulting powder is pressed and sintered according to conventional techniques to form a shaped refractory metal carbide body.

INDUSTRIAL APPLICABILITY

Metal carbide pieces depleted of matrix material may be comminuted to form a powder which may be mixed with a binder metal. The powder may be processed to form cemented metal carbides by pressing and sintering.

We claim:

1. A process for recovering selected portions of metal carbide from scrap material containing pieces of cemented metal carbide, said pieces having various compositions of metal carbide distributed in a matrix material, said process comprising treating the scrap material with a suitable liquid for a sufficient period of time to dissolve the matrix material into the liquid to form pieces of matrix depleted metal carbide, separating the liquids containing dissolved matrix material from the pieces of matrix depleted metal carbide, feeding the pieces of matrix depleted metal carbide into a ferrofluid material, passing a magnetic field through said fluid for positioning the pieces of matrix depleted metal carbide of the type having a heavier density spaced from the pieces of matrix depleted metal carbide of the type having a lighter density, collecting portions of pieces of matrix depleted metal carbide having a heavier density separate from the portion of pieces of matrix depleted metal carbide having a lighter density.

2. A process according to claim 1 wherein said suitable liquid comprises a boiling aqueous azeotropic hydrochloric acid solution.

3. A process according to claim 2 wherein said respective heavier and lighter portions of matrix depleted metal carbide pieces are comminuted to form a powder.

4. A process according to claim 1 wherein one of said portions of metal carbide pieces are reintroduced into said ferrofluid material for further separation.

5. A process for preparing a hard refractory cemented metal carbide body from a scrap material containing pieces of cemented metal carbide, said pieces having various compositions of metal carbide distributed in a matrix material, said process comprising treating the scrap material with a suitable liquid for a sufficient period of time to dissolve the matrix material into the liquid to form pieces of matrix depleted metal carbide, separating the liquid containing dissolved matrix material from the pieces of matrix depleted metal carbide, feeding the pieces of matrix depleted metal carbide into a ferrofluid material, passing a magnetic field through said fluid for positioning the pieces of matrix depleted metal carbide particles of the type having a heavier density spaced from the pieces of matrix depleted metal carbide of the type having a lighter density, collecting portions of pieces of matrix depleted metal carbide having a heavier density separate from a portion of pieces of matrix depleted metal carbide having a lighter density, comminuting at least one of said portions of metal carbide to form a metal carbide powder, mixing said metal carbide powder with a binder metal to form a resulting powder, and compressing and sintering said resulting powder to form a hard cemented metal carbide body.

6. A process according to claim 5 wherein said suitable liquid comprises a boiling aqueous azeotropic hydrochloric acid solution.

7. A process according to claim 6 wherein said respective heavier and lighter portions of matrix depleted metal carbide pieces are comminuted to form a powder.

8. A process according to claim 7 wherein one of said portions of metal carbide pieces are reintroduced into said ferrofluid for further separation.

* * * * *